US010761904B2

(12) United States Patent
Peter et al.

(10) Patent No.: US 10,761,904 B2
(45) Date of Patent: Sep. 1, 2020

(54) METHOD AND SYSTEM FOR SYNCHRONIZING AND JOINING MULTIPLE CALLS TO THE SAME ASYNCHRONOUS CODE SEGMENT

(71) Applicant: salesforce.com, inc., San Francisco, CA (US)

(72) Inventors: Wesley Peter, Sammamish, WA (US); Avi Brenner, Lynnwood, WA (US); Justin Horst, Renton, WA (US)

(73) Assignee: salesforce.com, inc., San Francisco, CA (US)

( * ) Notice: Subject to any disclaimer, the term of this patent is extended or adjusted under 35 U.S.C. 154(b) by 235 days.

(21) Appl. No.: 15/873,826

(22) Filed: Jan. 17, 2018

(65) Prior Publication Data

US 2019/0220326 A1    Jul. 18, 2019

(51) Int. Cl.
  *G06F 9/46* (2006.01)
  *G06F 9/52* (2006.01)
  *G06F 8/30* (2018.01)
  *G06F 9/48* (2006.01)

(52) U.S. Cl.
  CPC .............. *G06F 9/526* (2013.01); *G06F 8/311* (2013.01); *G06F 9/485* (2013.01)

(58) Field of Classification Search
  None
  See application file for complete search history.

(56) References Cited

U.S. PATENT DOCUMENTS

| 4,791,550 | A | * | 12/1988 | Stevenson | ............... G06F 8/45 707/999.004 |
|---|---|---|---|---|---|
| 5,983,227 | A | | 11/1999 | Nazem et al. | |
| 6,216,133 | B1 | | 4/2001 | Masthoff | |
| 6,236,978 | B1 | | 5/2001 | Tuzhilin | |
| 6,288,717 | B1 | | 9/2001 | Dunkle | |
| 6,411,949 | B1 | | 6/2002 | Schaffer | |
| 6,907,566 | B1 | | 6/2005 | McElfresh et al. | |
| 7,062,502 | B1 | | 6/2006 | Kesler | |
| 7,100,111 | B2 | | 8/2006 | McElfresh et al. | |

(Continued)

OTHER PUBLICATIONS

Final Office Action for U.S. Appl. No. 12/437,418, dated Apr. 16, 2012.

(Continued)

*Primary Examiner* — Van H Nguyen
(74) *Attorney, Agent, or Firm* — LKGlobal | Lorenz & Kopf, LLP

(57) ABSTRACT

Technologies are provided for synchronizing and joining multiple calls from a first thread and one or more second threads to execute a particular code segment. In response to a call from the first thread to execute the particular code segment, a task synchronizer module calls the particular code segment on behalf of the first thread. When execution of the particular code segment starts, and a call is received from a second thread to execute the particular code segment after receiving the call from the first thread, the task synchronizer module suspends execution of the particular code segment so that the second thread awaits for the execution of the particular code segment on behalf of the first thread to complete. When execution completes, a result value or exception is stored in a task object, and the second thread can read the result value or the exception.

20 Claims, 3 Drawing Sheets

(56) References Cited

U.S. PATENT DOCUMENTS

| | | | |
|---|---|---|---|
| 7,171,501 B2 * | 1/2007 | Bollella | G06F 9/4812 |
| | | | 710/240 |
| 7,269,590 B2 | 9/2007 | Hull et al. | |
| 7,360,220 B2 * | 4/2008 | Ramanujam | G06F 9/3851 |
| | | | 712/E9.053 |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,454,509 B2 | 11/2008 | Boulter et al. | |
| 7,599,935 B2 | 10/2009 | La Rotonda et al. | |
| 7,603,331 B2 | 10/2009 | Tuzhilin et al. | |
| 7,644,122 B2 | 1/2010 | Weyer et al. | |
| 7,668,861 B2 | 2/2010 | Steven | |
| 7,747,648 B1 | 6/2010 | Kraft et al. | |
| 7,827,208 B2 | 11/2010 | Bosworth et al. | |
| 7,853,881 B1 | 12/2010 | Aly Assal et al. | |
| 7,856,445 B2 | 12/2010 | Gross | |
| 7,945,653 B2 | 5/2011 | Zuckerberg et al. | |
| 7,991,764 B2 | 8/2011 | Rathod | |
| 8,005,896 B2 | 8/2011 | Cheah | |
| 8,073,850 B1 | 12/2011 | Hubbard et al. | |
| 8,103,611 B2 | 1/2012 | Tuzhilin et al. | |
| 8,150,913 B2 | 4/2012 | Cheah | |
| 8,166,013 B2 | 4/2012 | Bandaru et al. | |
| 8,522,000 B2 * | 8/2013 | Shebanow | G06F 9/327 |
| | | | 712/225 |
| 8,898,441 B2 * | 11/2014 | Frazier | G06F 9/30123 |
| | | | 712/233 |
| 2003/0140086 A1 * | 7/2003 | Bollella | G06F 9/4812 |
| | | | 718/108 |
| 2008/0010270 A1 | 1/2008 | Gross | |
| 2008/0147487 A1 | 6/2008 | Hirshberg | |
| 2008/0209320 A1 | 8/2008 | Mawhinney et al. | |
| 2010/0125502 A1 | 5/2010 | Solomon et al. | |
| 2010/0217757 A1 | 8/2010 | Fujioka | |
| 2010/0241576 A1 | 9/2010 | Beeri | |
| 2011/0078427 A1 * | 3/2011 | Shebanow | G06F 9/327 |
| | | | 712/244 |
| 2011/0209067 A1 | 8/2011 | Bogess et al. | |
| 2011/0258204 A1 | 10/2011 | Hubbard et al. | |
| 2012/0290407 A1 | 11/2012 | Hubbard et al. | |

OTHER PUBLICATIONS

Final Office Action for U.S. Appl. No. 12/356,429, dated May 2, 2012.

Notice of Allowance for U.S. Appl. No. 12/819,402, dated May 14, 2012.

Non-Final Office Action for U.S. Appl. No. 13/453,802, dated Jun. 8, 2012.

Linear Combination—Wikipedia (http://en.wikipedia.org/wiki/Linear_Combination (accessed Jul. 16, 2012).

\* cited by examiner

METHOD AND SYSTEM FOR SYNCHRONIZING AND JOINING MULTIPLE CALLS TO THE SAME ASYNCHRONOUS CODE SEGMENT

TECHNICAL FIELD

Embodiments of the subject matter described herein relate generally to synchronizing execution of a code segment. More particularly, embodiments of the subject matter relate to a method and system for synchronizing and joining multiple calls by multiple threads to the same asynchronous code segment.

BACKGROUND

With the development of complex computing applications, modern application programming has become quite intricate. Application programs created these days pose a requirement for extensive processing resources. However, available processing resources may not satisfy this requirement. Hence, it is essential that the available processing resources be optimized. At the same time, the application program needs to be run as efficiently as possible, while still maintaining the process complexities. Use of multithreaded programming has proved to be beneficial in optimizing the available processing resources as well as efficiently running the application program.

In multithreaded programming, an application program is written as a set of parallel activities or threads. A thread is an instance of a sequence of code that is executed as a unit. The partitioning of an application program into multiple threads results in easily manageable and faster program execution.

Each thread requires certain resources like processor time, memory resources, and input/output (I/O) services in order to accomplish its objective. An operating system allocates these resources to various threads. The operating system provides a scheduling service that schedules the thread for running on the processor.

In some cases, multiple threads in an application make identical calls at the same time. The exact same data is returned. Each thread runs the same exact code to parse the network response. A traditional lock makes each thread wait to take its turn, and then once a thread has it's turn it will execute the code. However, if many threads are waiting on a lock then each thread will wait to take it's turn and then execute that code. This means that the same execution takes place multiple times. This approach can be inefficient, waste bandwidth, and slow because multiple threads are fighting for the same network resources.

It would be desirable to make the thread processing more efficient so that it consumes less computing resources than a conventional approach where each thread is executed independently at or near the same time.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Technologies are provided for synchronizing and joining multiple calls from a first thread and one or more second threads to execute a particular code segment. In response to a call from the first thread to execute the particular code segment, a task synchronizer module calls the particular code segment on behalf of the first thread. When execution of the particular code segment starts, and a call is received from a second thread to execute the same particular code segment (e.g., after receiving the call from the first thread), the task synchronizer module suspends execution of the particular code segment in response to the call from the second thread so that the second thread awaits for the execution of the particular code segment on behalf of the first thread to complete. When execution of the particular code segment completes, a result value or exception is stored in a task object, and the second thread can read the result value or the exception that is stored in the task object.

According to one implementation, if two or more threads are running the same code, only the very first thread executes the code, and the other threads wait (or "await" in c #) meaning the thread resources are returned to a thread scheduler so other code paths can use those resources for execution while waiting for the first thread to execute. Once the first thread is done executing and stored the result/exception in a task object, all other threads can read the same result (or exception) that is stored in the task object and continue execution.

Figure 1:
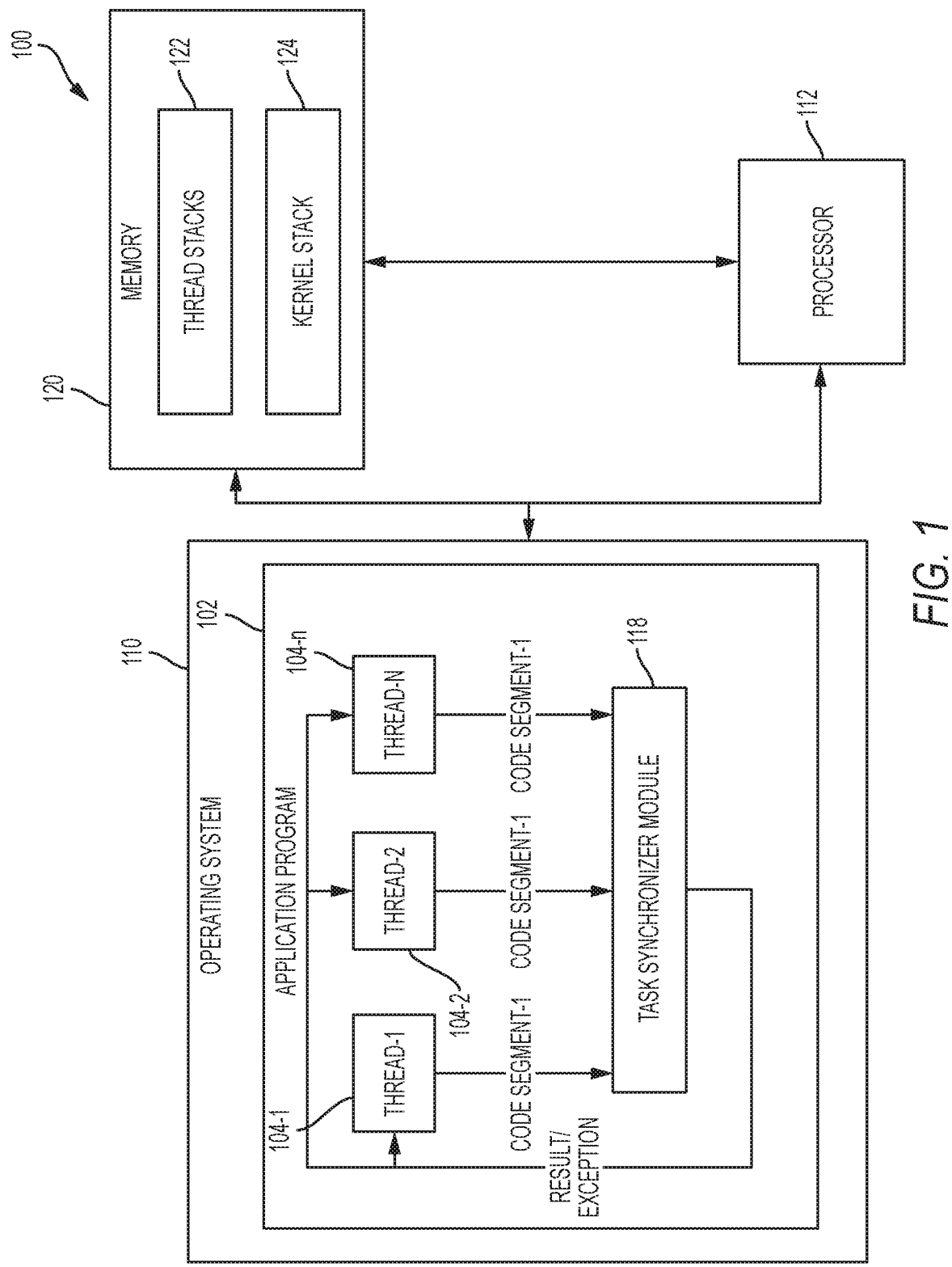
FIG. 1 is a schematic diagram of a computing system in which an application program can be executed in accordance with the disclosed embodiments.

FIG. 1 is a schematic diagram of a computing system 100 in which an application program 102 can be executed in accordance with the disclosed embodiments. The computing system 100 comprises an operating system 110, at least one processor 112 and memory 120 that work together to provide a multithreaded processing environment.

Application Program

Although not illustrated in FIG. 1, as is known in the art, the application program 102 is stored on a disk or other form of secondary memory of the computing system. The application program 102 is a passive collection of instructions that perform a specific task or set of tasks when executed by a computer such as computing system 100. The application program 102 is written as a series of functions and other program constructs using threads 104. A thread 104 is an entity (e.g., an independent stream of instructions of a program) within a process that can be scheduled for execution and be executed within the context of the program. A thread can be thought of as the smallest executable unit of a process. The threads 104 can be written, compiled and executed according to standard thread methodology.

As used herein, the term "code" may include software, firmware, byte-code and/or microcode, and may refer to programs, routines, functions, classes, and/or objects. As used herein, depending on the context, the term "code" can refer to either source code (e.g., statements written in a particular programming language), or object code (i.e., the source code after it has been processed by a compiler and made ready to run in the computer). Although not illustrated, a compiler processes source code (i.e., statements written in a particular programming language) and converts source code statements into object code (i.e., machine language or "code" that a computer's processor uses). For example, from a program or application, in its human-readable form of source code, the compiler can derive machine code that are in a form of instructions that the computer can directly execute. Alternatively, a computer program may be executed with the aid of an interpreter.

As used herein, a code segment can refer to a portion of an object file or the corresponding section of the program's virtual address space that contains executable instructions. To explain further, when a program is stored in an object file, the code segment is a part of this file; when the loader places a program into memory so that it may be executed, various memory regions are allocated (e.g., as pages), corresponding to both the segments in the object files and to segments only needed at run time. For example, the code segment of an object file is loaded into a corresponding code segment in memory.

Operating System

The operating system 110 schedules execution of the compiled application code by one or more processors 112. This involves periodic loading of certain threads on the processors 112 (e.g., by a thread scheduler) for execution, while blocking execution of other threads. For instance, a thread scheduler (not illustrated in FIG. 1) can schedule various threads on processors by maintaining a ready queue that holds threads in a ready state, where the threads are ready for processing and are waiting for allocation of a free processor to execute them. When the software program is being executed, the process includes one or more threads of execution which is simply referred as threads.

Processes

When the instructions that make up the program 102 are actually being executed (e.g., running on the computer), this is commonly referred to as a process. A process can refer to a program in memory along with dynamically-allocated storage (the heap), the stack, and the execution context, which comprises the state of the processor's registers and instruction pointer (program counter). The stack, instruction pointer, and registers controls the execution flow of the program. The instruction pointer keeps track of which instructions to execute next, and those instructions affect the registers. Subroutine call/return instructions, as well instructions that push or pop registers on the stack on entry to or exit from a function call, adjust the contents of the stack and the stack pointer. This stream of instructions can be referred to as the process' thread of execution.

The process provides the resources needed to execute the program. For example, a process can have a virtual address space, executable code, open handles to system objects, a security context, a unique process identifier, environment variables, a priority class, minimum and maximum working set sizes, and threads of execution. When execution of the program 102 is initiated, the operating system's kernel creates a process. The kernel assigns memory space and other resources, establishes a priority for the process, loads program binary code into memory, and initiates execution of the application program 102, which then interacts with the user and with hardware devices.

The operating system 110 keeps track of each process by storing information about that process in a data structure called a process control block (PCB). For example, the operating system keeps track of the memory map, saved registers, and stack pointer in a process control block (PCB) and the operating system's scheduler (not shown) is responsible for making sure that the process gets to run.

Multithread Process

A single thread process includes only one thread, while multithread process can include more than one thread of execution. To explain further, when the program 102 contains multiple concurrent threads of execution, the process is made up of multiple threads of execution that execute instructions concurrently, and therefore, the process is said to be multithreaded. In a multithreaded process, all threads of the same process share memory of that process. All threads of a process share its virtual address space and system resources. Each thread has its own task and own path of execution in a process. Each thread executes a particular code segment in that process's address space. Because threads of the same process share the same memory, communication between the threads is fast. In addition, each thread can maintain exception handlers, a scheduling priority, thread local storage, a unique thread identifier, and a set of structures the system will use to save the thread context until it is scheduled. The thread context includes the thread's set of machine registers, the kernel stack, a thread environment block, and a user stack in the address space of the thread's process Because a multithreaded process has multiple threads, the operating system 110 also keeps track of each thread of a process in a data structure called a thread control block (TCB). Each PCB will point to a list of TCBs. The operating system has a thread scheduler (not shown in FIG. 1) that is responsible for preempting and scheduling all threads of all processes. In a multithreaded process, all of the process' threads share the same memory and open files. Within the shared memory, each thread gets its own stack. Each thread has its own instruction pointer and registers. The items that the operating system must store that are unique to each thread can include: a thread ID; saved registers, stack pointer, instruction pointer; a stack (local variables, temporary variables, return addresses), a signal mask, and scheduling information (also known as priority). On the other hand, the items that are shared among threads within a process include a code segment (also referred to as a text segment) that can be executed by each of the threads.

Memory

Memory 122 can include thread stacks 122 and a kernel stack 124. Threads 104 are executed by processor 112 according to the thread methodology. Activation records of the threads as well as their context are stored on thread stacks 122 stored in memory 120, when these threads swap out. Thread stacks 122 keep track of various function calls and returns, in addition to storing the required local variables. Although not illustrated, there is one independent stack for each thread. The kernel stack 124 associated with processor 112 is used as the execution stack in turns by all threads running on that processor 112. In a multiprocessor environment there is one such kernel stack associated with each processor. This is the internal execution stack for the operating system 110 corresponding to the processor 112.

Task Synchronizer Module

In some systems, multiple calls can be made simultaneously (e.g., at or near the same time) to execute the same code segment. Stated differently, multiple different instances of the same thread of the program can be called for execution at or near the same time. As such, the same threads 104 can all be executed at the same time and perform the same task. This consumes computing resources needed to execute multiple instances of the same thread even though each of those threads is performing the same task. This can be inefficient particular when it happens on a large scale. In accordance of the disclosed embodiments, a task synchronizer module 118 is provided that can synchronize and join multiple calls from different threads to execute the same particular code segment. This makes the process more efficient and consumes less computing resources than a conventional approach where each thread is executed independently at (or very near) the same time.

To explain further, in FIG. 1, the different instances of the same thread are illustrated as thread-1 104-1 through thread-N 104-N. Each of the threads share the same particular code segment, and each of the threads can read, write or change data of the other threads of the process. In this snapshot sequence, it is assumed that thread-1 104 through thread-N 104 have been called during a particular time frame to execute a particular code segment (CODE SEGMENT-1); however, it should be appreciated that any number of instances of the same thread 104, not shown in FIG. 1, could also be called to execute the same particular code segment during a certain time frame. In accordance with some of the disclosed embodiments, a "code segment" can be, for example, part of a code block, a code block, or multiple code blocks. In some implementations, a code segment may be an asynchronous code segment. For instance, a code segment can refer to code blocks or portions of code blocks written in C sharp or C # programming languages.

In response to a call from the first thread 104-1 to execute the particular asynchronous code segment, the task synchronizer module 118 calls the particular asynchronous code segment on behalf of the first thread 104-1. When execution of the particular asynchronous code segment starts, and a call is received from a second thread 104-2 or 104-N to execute the same particular asynchronous code segment (e.g., after receiving the call from the first thread 104-1), the task synchronizer module 118 suspends execution of the particular asynchronous code segment in response to the call from the second thread 104-2 or 104-N so that the second thread awaits for the execution of the particular asynchronous code segment on behalf of the first thread 104-1 to complete.

When execution of the particular asynchronous code segment completes, a result value or exception is stored in a task object, and the second thread 104-2 or 104-N can read the result value or the exception that is stored in the task object.

Thus, if two or more threads are running the same asynchronous code segment, only the very first thread 104-1 executes the code segment, and the other threads 104-2 or 104-N wait (or "await" in c #) meaning the thread resources are returned to the thread scheduler so other code paths can use those resources for execution while waiting for the first thread to execute. Once the first thread is done executing the particular asynchronous code segment, the result/exception is stored in a task object, all other threads can read the same result (or exception) that is stored in the task object and continue execution.

Figure 2:
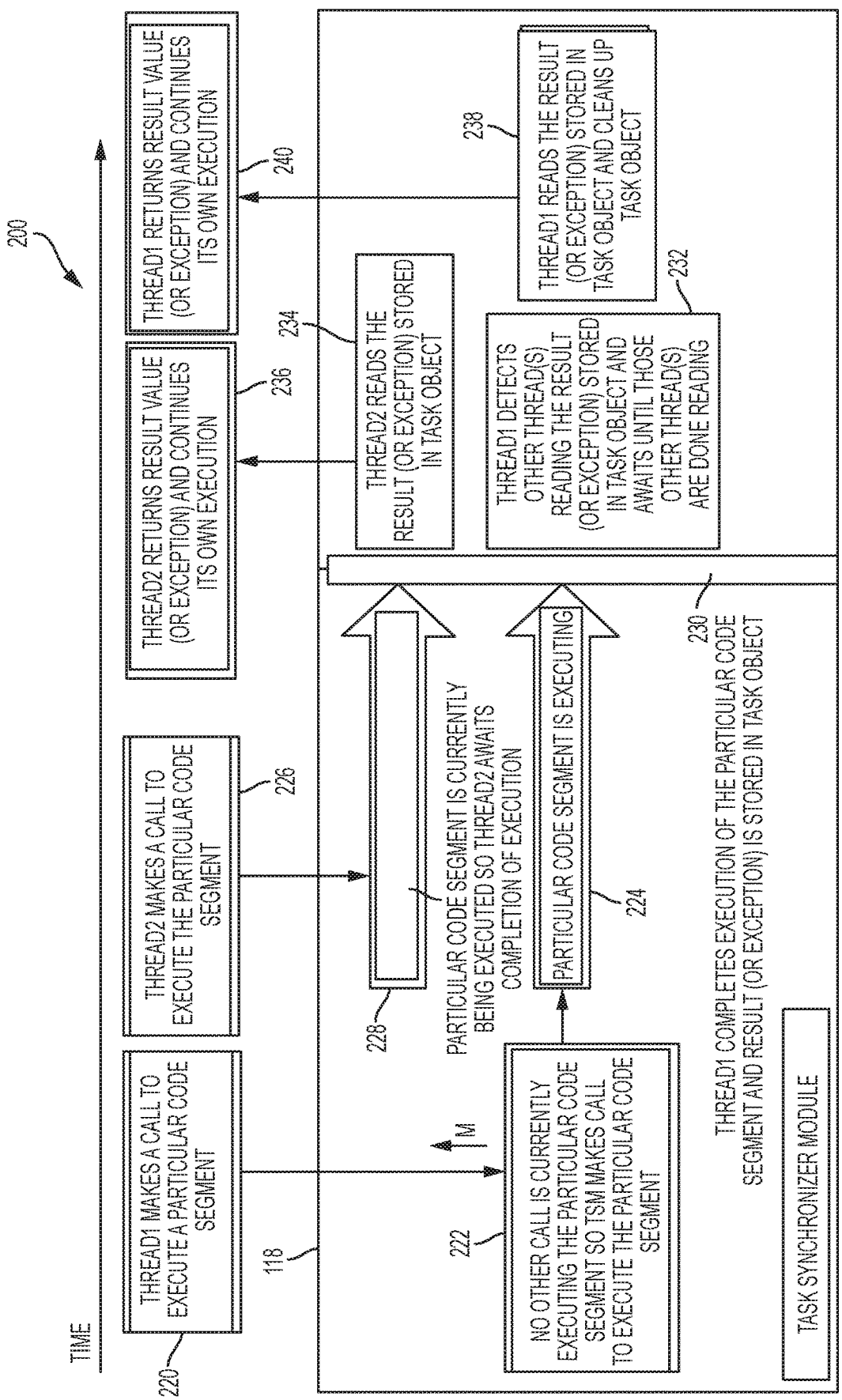
FIG. 2 is a flow diagram that illustrates a method performed by a task synchronizer module to synchronizing and joining multiple calls to execute an asynchronous code segment of a programming language in accordance of the disclosed embodiments.
Figure 3:
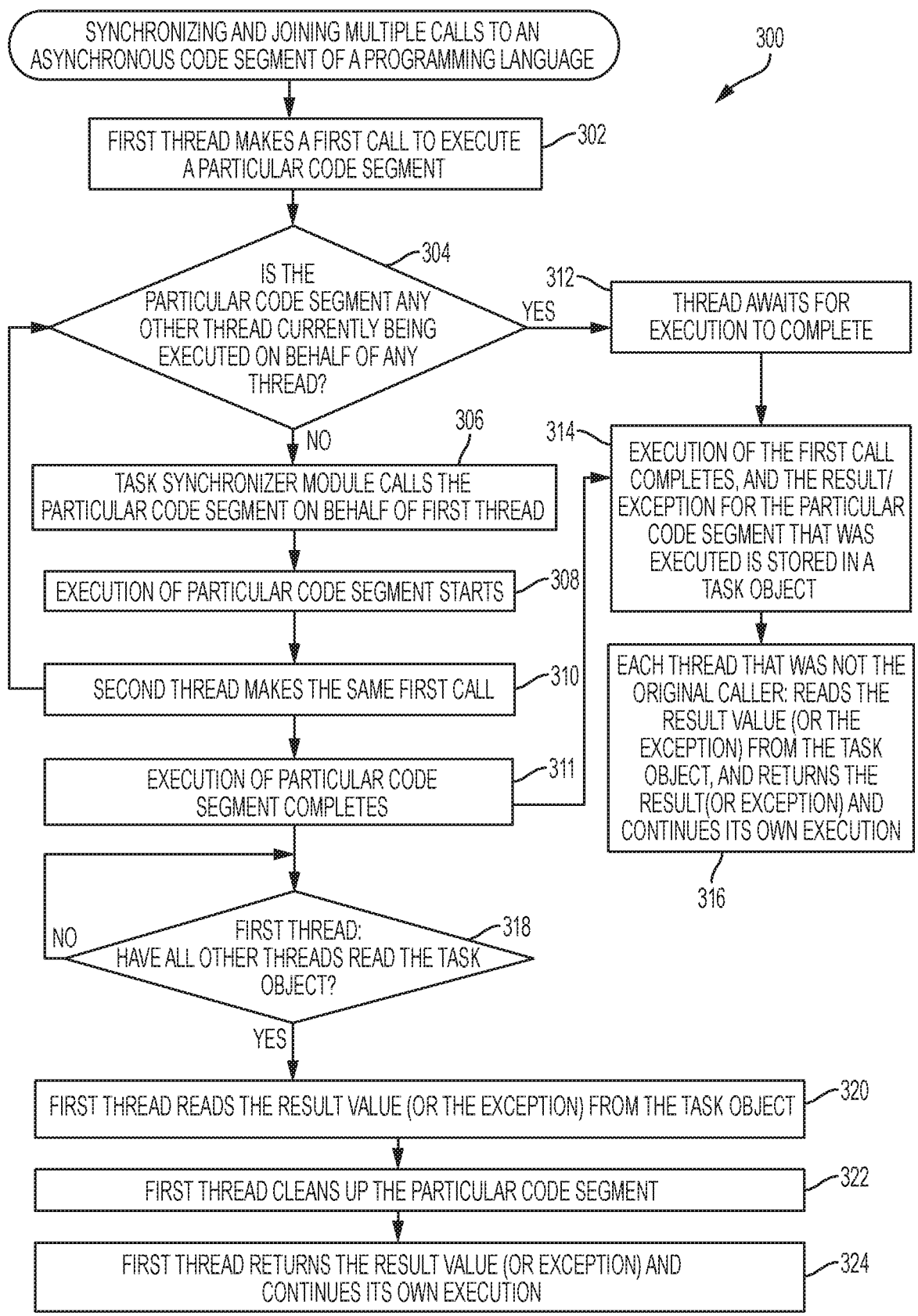
FIG. 3 is a flow chart that illustrates a method for synchronizing and joining multiple calls to execute an asynchronous code segment of a programming language in accordance of the disclosed embodiments.

The task synchronizer module 118 will now be described in greater detail below with reference to FIGS. 2 and 3, which are a flow diagram and a flowchart that illustrate methods performed by the task synchronizer module 118 in accordance with the disclosed embodiments. FIGS. 2 and 3 will be described with continued reference to FIG. 1.

Prior to describing FIGS. 2 and 3, it should be noted that the flows and steps of each method shown are not necessarily limiting. Steps can be added, omitted, and/or performed simultaneously without departing from the scope of the appended claims. Each method may include any number of additional or alternative tasks, and the tasks shown need not be performed in the illustrated order. Each method may be incorporated into a more comprehensive procedure or process having additional functionality not described in detail herein. Moreover, one or more of the tasks shown could potentially be omitted from an embodiment of each method as long as the intended overall functionality remains intact. Further, each method is computer-implemented in that various tasks or steps that are performed in connection with each method may be performed by software, hardware, firmware, or any combination thereof. For illustrative purposes, the following description of each method may refer to elements mentioned above in connection with FIG. 1. In certain embodiments, some or all steps of these methods, and/or substantially equivalent steps, are performed by execution of processor-readable instructions stored or included on a processor-readable medium. For instance, in the description of FIGS. 2 and 3 that follows, the task synchronizer module can be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together.

FIG. 2 is a flow diagram that illustrates a method 200 performed by a task synchronizer module 118 to synchronizing and joining multiple calls to execute an asynchronous code segment of a programming language in accordance of the disclosed embodiments. In this snapshot sequence, two threads have made calls during a particular time frame to execute a particular code segment; however, it should be appreciated that any number of other threads, not shown in FIG. 2, could also make the same call to execute the same particular code segment during the same time frame. A "code segment" can be, for example, part of a code block, a code block, or multiple code blocks. For instance, code blocks in C sharp or C # code. As used herein, a programming language can be an imperative or procedural programming language C sharp), or a functional programming language. Imperative programming describes computation in terms of a program state and statements that change that program state. Imperative programs are a sequence of commands for the computer to perform. Most of the high-level languages support imperative programming.

The method begins at 220 where first thread (thread1) makes a call to execute a particular code segment (e.g., GetRecordsAsync( )). For reference purposes, this "call" will be referred to below as a "first call" even though no temporal order applies with respect to the term "first."

At 222, task synchronizer module 118 determines that there are no other calls currently executing the particular code segment so the task synchronizer module 118 calls (e.g., GetRecords( )) on behalf of first thread (thread1) to execute the particular code segment. The arrow 224 represents the execution of the particular code segment, made in the first call, being executed.

At a point very close in time (e.g., a few hundred milliseconds) after first thread (thread1) makes the first call, at 226, a second thread (thread2) makes the "same" first call to execute a particular code segment (e.g., GetRecordsAsync( )). In accordance of the disclosed embodiments, at 228, because the particular code segment is currently being executed, the second thread (thread2) waits (or "awaits") for execution of the particular code segment to complete.

At 230, the first thread completes execution of the particular code segment and the result value (or exception) is stored in a task object (e.g., after execution of the first call completes, and the results are stored in GetRecordsTask). After 230, any threads, such as thread2, that previously made a call to execute the particular code segment, are permitted, at 232 to read the result (or exception) that is stored in the task object. In this example, only thread2 is shown, but it should be appreciated that any number of threads could also have made a call prior to 230, and then be permitted, at 232 to read the result (or exception) that is stored in the task object.

Any threads that make a call to execute the particular code segment prior to 230 will be locked and prevented from executing the particular code segment so that those incoming threads calling for execution of the particular code segment (prior to 230) will not interrupt the thread that is executing at 228. Any number of other threads could make a call after 230 and one of those threads (along with others that called after 230) would execute a similar processing sequence as those that made a call prior to 230 to execute the particular code segment. However, that thread would not be permitted to read the result (or exception) that is stored in the task object (as a result of execution by thread1) because it would have been cleared or cleaned up by the first thread at 322.

At 232, first thread (thread1) detects other threads (not shown in FIG. 2 other than thread2) are reading the result value (or exception) that is stored in the task object, and the first thread (thread1) awaits until those other threads are done reading the result value (or exception) that is stored in the task object. At 234, which can occur near in time or simultaneously with 232, second thread (thread2) reads the result value (or the exception) from the task object, and at 236, second thread (thread2) returns the result value (or the exception) and continues its own execution. When the other threads are done reading the result value (or exception) that is stored in the task object, at 238, first thread (thread1) reads the result value (or the exception) that are stored in the task object, and then cleans up the task object. At 240, first thread (thread1) returns the result value (or exception) and continues its own execution.

FIG. 3 is a flow diagram that illustrates a method 300 for synchronizing and joining multiple calls to execute an asynchronous code segment of a programming language in accordance of the disclosed embodiments. FIG. 3 will be described with continued reference to FIG. 2. A. "code segment" and a "programming language" are described above.

The method 300 begins at 302 where first thread (thread1) makes a call to execute a particular code segment, which is referred to below as a first call.

At 304, task synchronizer module 118 determines whether there are any other threads are currently executing the particular code segment. If other threads are currently executing the particular code segment (at 304), then at 312, the first thread awaits for execution to complete. If no other threads are currently executing the particular code segment (at 304), then at 306, the task synchronizer module 118 calls on behalf of first thread (thread1) to execute the particular code segment. The path in FIG. 3 that links 304 to 322 is used to implement a lock so that incoming threads, before 311, calling for execution of the particular code segment will not interrupt the thread that is executing at 308.

At 308, execution of the particular code segment, made in the first call, begins.

At a point very close in time (e.g., a few hundred milliseconds) after first thread (thread1) makes the first call, at 310, a second thread (thread2) makes the same first call (e.g., GetRecordsAsync( )). When this happens, the method 300 loops to 304, where the second thread determines whether the particular code segment (that is associated with the first call) is currently being executed by any other threads, and because the first thread is currently executing the particular code segment (that is associated with the first call), the method proceeds to 312, where the second thread (thread2) waits (or "awaits") for execution of the particular code segment to complete.

At 311, the first thread completes execution of the particular code segment (that is associated with the first call), and following 311, the method proceeds to 314 and 318.

After execution of the particular code segment (that is associated with the first call) completes, at 314, the result value (or exception) is stored in a task object (e.g., after execution of the first call completes, and the results are stored in GetRecordsTask). At 316, any threads, such as thread2, that previously made a call to execute the particular code segment, are then permitted, at 316 to read the result value (or exception) that is stored in the task object and continue their own execution. Any number of threads that were awaiting for execution to complete (e.g., and made a call prior to 311) are permitted, at 316, to read the result value (or exception) that is stored in the task object.

The path in FIG. 3 that links 304 to 322 is used to implement a lock so that incoming threads, before 311, calling for execution of the particular code segment will not interrupt the thread that is executing at 308. Any number of other threads could also make a call after 311, and would not be permitted to read the result (or exception) that is stored in the task object because it would have been cleared or cleaned up (at 322), and one of those threads (along with others that called after 311) could execute a similar processing sequence as those that made a call prior to 311.

Meanwhile, at 318, which can take place at any point after 311, the first thread (thread1) determines whether any other threads are reading the result value (or exception) that is stored in the task object that resulted from execution of the particular code segment. When the first thread (thread1) detects (at 318) that any other threads are reading, the first thread awaits until those other threads are done reading the result value (or exception) that is stored in the task object (as indicated by loop from 318 back to 318).

When the first thread (thread1) detects (at 318) that no other threads are reading the result value (or exception) that is stored in the task object (i.e., the other threads are done reading), the method proceeds to 320. At 320, the first thread (thread1) reads the result value (or the exception) that is stored in the task object, and then at 322, cleans up the task object from the task object. At 324, the first thread (thread1) returns the result value (or exception) and continues its own execution.

The following description is of one example of a system in which the features described above may be implemented. The components of the system described below are merely one example and should not be construed as limiting. The features described above with respect to FIGS. 1-3 may be implemented in any other type of computing environment, such as one with multiple servers, one with a single server, a multi-tenant server environment, a single-tenant server environment, or some combination of the above.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for synchronizing and joining multiple calls from a first thread and one or more second threads to execute a particular code segment, the method comprising:
   in response to a call from the first thread to execute the particular code segment: calling, via a task synchronizer module, the particular code segment on behalf of the first thread;
   starting execution of the particular code segment on behalf of the first thread;
   receiving, after receiving the call from the first thread, a call from a second thread to execute the particular code segment on behalf of the first thread;
   suspending, at the task synchronizer module, execution of the particular code segment on behalf of the second thread in response to the call from the second thread so that only the first thread is running while the second thread awaits for the execution of the particular code segment on behalf of the first thread to complete;
   storing, when execution of the particular code segment completes on behalf of the first thread, a result value or exception in a task object; and
   reading, at the second thread without executing the particular code segment, the result value or the exception that is stored in the task object on behalf of the first thread.

2. The method according to claim 1, further comprising:
   in response to receiving the call from the first thread to execute the particular code segment, determining at the task synchronizer module, whether the particular code segment is currently being executed on behalf of any other thread; and
   when the task synchronizer module determines that the particular code segment is not currently being executed on behalf of any other thread, wherein the step of calling comprises:
   calling, via the task synchronizer module, the particular code segment on behalf of the first thread.

3. The method according to claim 1, further comprising:
   receiving a call from a third thread to execute the particular code segment prior to receiving the call from the first thread;
   in response to receiving the call from the first thread to execute the particular code segment, determining at the task synchronizer module, whether the particular code segment is currently being executed on behalf of any other thread;

when the task synchronizer module determines that the particular code segment is currently being executed on behalf of a third thread, wherein the step of calling comprises: calling, via the task synchronizer module, the particular code segment on behalf of the third thread; and wherein the starting step comprises: starting execution of the particular code segment on behalf of the third thread; and when the task synchronizer module determines that the particular code segment is currently being executed on behalf of the third thread: suspending, at the task synchronizer module, execution of the particular code segment in response to the call from the first thread so that the first thread awaits for the execution of the particular code segment on behalf of the third thread to complete.

4. The method according to claim 3, wherein the step of storing, comprises:

storing, when execution of the particular code segment on behalf of the third thread completes, the result value or exception in the task object; and wherein reading comprises:

reading, at the first thread, the result value or the exception that is stored in the task object.

5. The method according to claim 1, when execution of the particular code segment on behalf of the first thread completes, further comprising:

determining whether all of the second threads, which were awaiting execution of the particular code segment on behalf of the first thread to complete, have read the result value or the exception that is stored in the task object;

reading, at the first thread, the result value or the exception that is stored in the task object when it is determined that all of the second threads, which were awaiting execution of the particular code segment on behalf of the first thread to complete, have read the result value or the exception that is stored in the task object;

cleaning up the particular code segment; and returning, via the first thread, the result value or the exception that was read from the task object and continuing execution of the first thread.

6. The method according to claim 1, wherein the particular code segment comprises one of:

part of a code block, a code block; and multiple code blocks.

7. The method according to claim 1, wherein the particular code segment comprises:

a particular asynchronous code segment that is written in a programming language.

8. The method according to claim 7, wherein the programming language is an imperative or a procedural programming language.

9. The method according to claim 7, wherein the programming language is a functional programming language.

10. A computing system, comprising:

a memory configured to store: a first set of computer-executable instructions for an application comprising a particular code segment; and a second set of computer-executable instructions for a task synchronizer module that is configurable to synchronize and join multiple calls from a first thread and one or more second threads to execute the particular code segment; and a processing system configured to execute the first set and the second set of the computer-executable instructions, wherein execution of the computer-executable instructions by the processing system causes the computing system to:

call, in response to a call from the first thread to execute the particular code segment, the particular code segment on behalf of the first thread;

start execution of the particular code segment on behalf of the first thread;

receive, after receiving the call from a first thread, a call from a second thread to execute the particular code segment on behalf of the first thread;

suspend execution of the particular code segment on behalf of the second thread in response to the call from the second thread so that only the first thread is running while the second thread awaits for the execution of the particular code segment on behalf of the first thread to complete;

store, when execution of the particular code segment completes on behalf of the first thread, a result value or exception in a task object; and read, at the second thread without executing the particular code segment, the result value or the exception that is stored in the task object on behalf of the first thread.

11. The computing system according to claim 10, wherein the processor is further configured to execute the computer-executable instructions to:

determine, in response to receiving the call from the first thread to execute the particular code segment, whether the particular code segment is currently being executed on behalf of any other thread; and when the particular code segment is not currently being executed on behalf of any other thread, wherein the calling and starting comprise:

call the particular code segment on behalf of the first thread.

12. The computing system according to claim 10, wherein the processor is further configured to execute the computer-executable instructions to:

receive a call from a third thread to execute the particular code segment prior to receiving the call from the first thread;

determine, in response to receiving the call from the first thread to execute the particular code segment, whether the particular code segment is currently being executed on behalf of any other thread;

when the particular code segment is determined to be currently being executed on behalf of a third thread, wherein the processor is further configured to execute the computer-executable instructions to:

call the particular code segment on behalf of the third thread; and start the execution of the particular code segment on behalf of the third thread; and when the particular code segment is currently being executed on behalf of the third thread wherein the processor is further configured to execute the computer-executable instructions to: suspend execution of the particular code segment in response to the call from the first thread so that the first thread awaits for the execution of the particular code segment on behalf of the third thread to complete.

13. The computing system according to claim 12, wherein the processor is further configured to execute the computer-executable instructions to:

store, when execution of the particular code segment on behalf of the third thread completes, the result value or exception in the task object; and read, at the first thread, the result value or the exception that is stored in the task object.

14. The computing system according to claim 10, when execution of the particular code segment on behalf of the first thread completes, wherein the processor is further configured to execute the computer-executable instructions to:
determine whether all of the second threads, which were awaiting execution of the particular code segment on behalf of the first thread to complete, have read the result value or the exception that is stored in the task object;
when it is determined that all of the second threads, which were awaiting execution of the particular code segment on behalf of the first thread to complete, have read the result value or the exception that is stored in the task object:
read, at the first thread, the result value or the exception that is stored in the task object;
clean up the particular code segment; and
return, via the first thread, the result value or the exception that was read from the task object and continue execution of the first thread.

15. The computing system according to claim 10, wherein the particular code segment comprises one of:
part of a code block,
a code block; and
multiple code blocks.

16. The computing system according to claim 10, wherein the particular code segment comprises:
a particular asynchronous code segment that is written in a programming language.

17. The computing system according to claim 16, wherein the programming language is an imperative or a procedural programming language.

18. The computing system according to claim 16, wherein the programming language is a functional programming language.

19. A computer program product for use with a computing system, the computer program product comprising a non-transitory computer readable medium having a computer readable program code embodied therein, the computer program product comprising:
a first set of computer-executable instructions for an application comprising a particular code segment; and
a second set of computer-executable instructions configurable to synchronize and join multiple calls from a first thread and one or more second threads to execute the particular code segment, wherein the second set of the computer-executable instructions are configured to:
call the particular code segment on behalf of the first thread, in response to a call from the first thread to execute the particular code segment;
start execution of the particular code segment on behalf of the first thread;
receive, after receiving the call from the first thread, a call from a second thread to execute the particular code segment on behalf of the first thread;
suspend execution of the particular code segment on behalf of the second thread in response to a call from a second thread to execute the particular code segment that is received after the call from the first thread so that only the first thread is running while the second thread awaits for the execution of the particular code segment on behalf of the first thread to complete;
store, when execution of the particular code segment completes on behalf of the first thread, a result value or exception in a task object; and
read, at the second thread without executing the particular code segment, the result value or the exception that is stored in the task object on behalf of the first thread.

20. The computer program product according to claim 19, wherein the second set of the computer-executable instructions are further configured to:
determine, in response to receiving the call from the first thread to execute the particular code segment, whether the particular code segment is currently being executed on behalf of any other thread; and
when the particular code segment is not currently being executed on behalf of any other thread, call the particular code segment on behalf of the first thread.

* * * * *